No. 819,066. PATENTED MAY 1, 1906.
H. HERROLD.
COTTON CHOPPER.
APPLICATION FILED JUNE 26, 1905.

Witnesses
Jos F. Collins.
Flora Pierce.

Inventor
Hiram Herrold
By
Julian C. Dowell Mon
his Attorney.

No. 819,066. PATENTED MAY 1, 1906.
H. HERROLD.
COTTON CHOPPER.
APPLICATION FILED JUNE 26, 1905.

Witnesses
Jos. F. Collins
Flora Pierce

Inventor
Hiram Herrold
By Julian C. Dowell
his Attorneys

No. 819,066. PATENTED MAY 1, 1906.
H. HERROLD.
COTTON CHOPPER.
APPLICATION FILED JUNE 26, 1905.

UNITED STATES PATENT OFFICE.

HIRAM HERROLD, OF LUTHER, OKLAHOMA TERRITORY.

COTTON-CHOPPER.

No. 819,066.   Specification of Letters Patent.   Patented May 1, 1906.

Application filed June 26, 1905. Serial No. 267,075.

*To all whom it may concern:*

Be it known that I, HIRAM HERROLD, a citizen of the United States, residing at Luther, in the county of Oklahoma and Territory of Oklahoma, have invented certain new and useful Improvements in Cotton-Choppers; and I do hereby declare the following to be a full, clear, and exact description of the invention, such as will enable others skilled in the art to which it appertains to make and use the same.

This invention relates to cotton-choppers or machines for thinning or cutting out the surplus plants in rows of young cotton or other growths, wherein the chopping-tool is actuated by a moving part of the machine to cut through the row at proper intervals—say every twelve or eighteen inches—insuring to the remaining plants a better chance for thriving growth and development. The chief objects and advantages thereof are as follows: first, flexibility of construction, allowing relative movement of the assembled parts of the machine, whereby the machine is evenly and easily drawn, less affected by the unevenness of the ground, and the chopping mechanism is caused to act at a substantially uniform depth in the soil and is more readily guided to follow the row notwithstanding the uneven movement of the drive-wheels of the implement; second, perfect control of the steering, means being provided whereby the course of the machine can be controlled by the feet of the operator and quickly changed without depending upon the team for this purpose, leaving the driver's hands free for the management of the team; third, provision for lifting the front end of the machine, together with the choppers, out of the ground when desired, as in turning at the end of a row, and improved means for gaging the depth of penetration of the choppers, and, fourth, provision of improved chopping mechanism and connections operating efficiently upon the row and whereof the chopping-blades are adapted to yield in case of striking any hard obstruction.

The invention will be fully described with reference to the accompanying drawings, which form a part of this specification, and will then be particularly pointed out and defined in the appended claims.

In said drawings.

Figure 1:
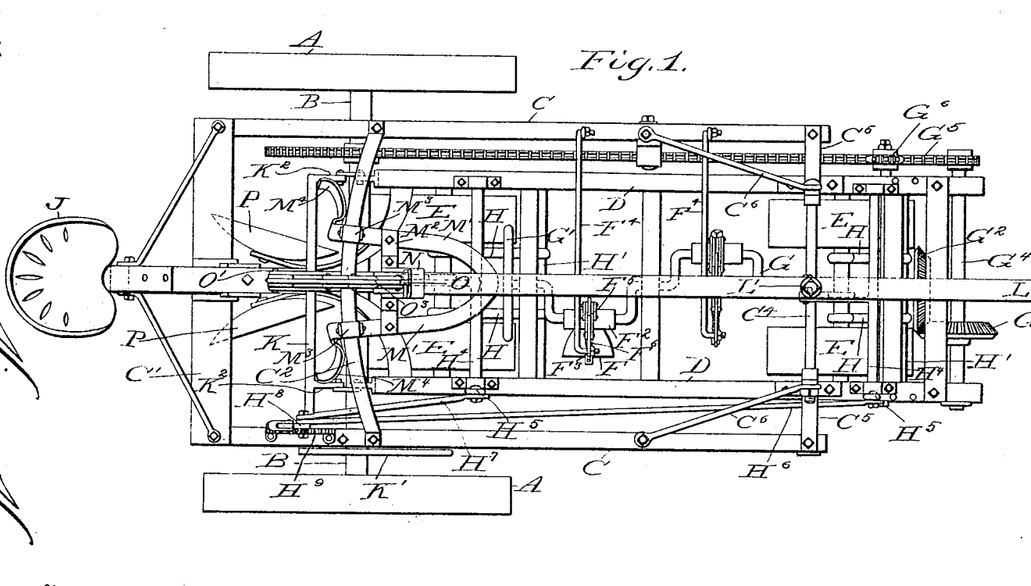
Figure 1 is a top plan view of a machine embodying my invention.
Figure 2:
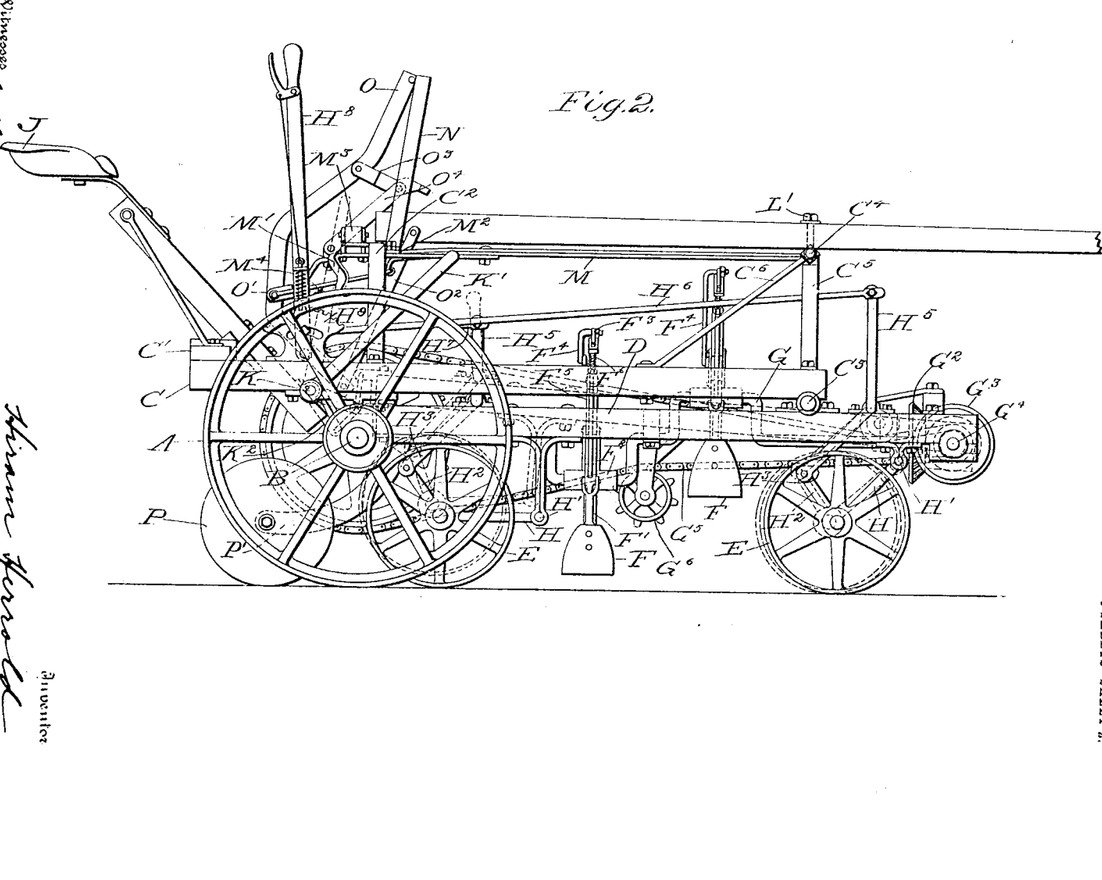
Fig. 2 is a side elevation thereof.
Figure 3:
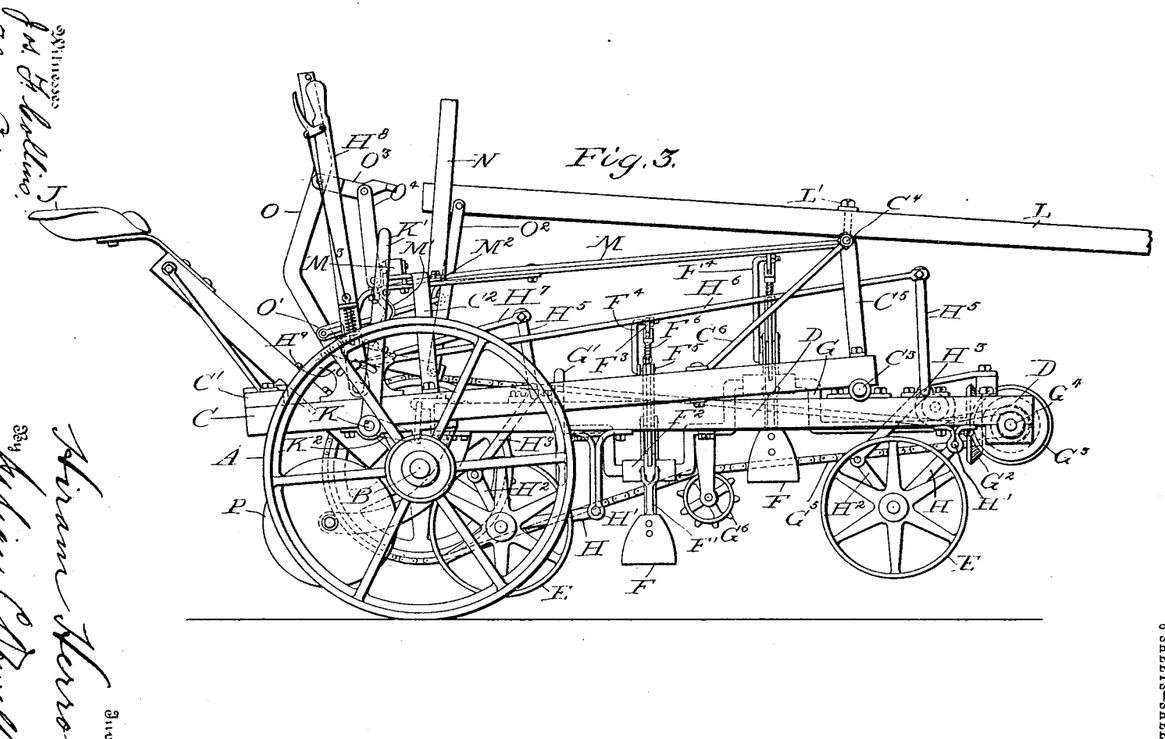
Fig. 3 is a side view showing the machine in the act of having its front part raised.
Figure 4:
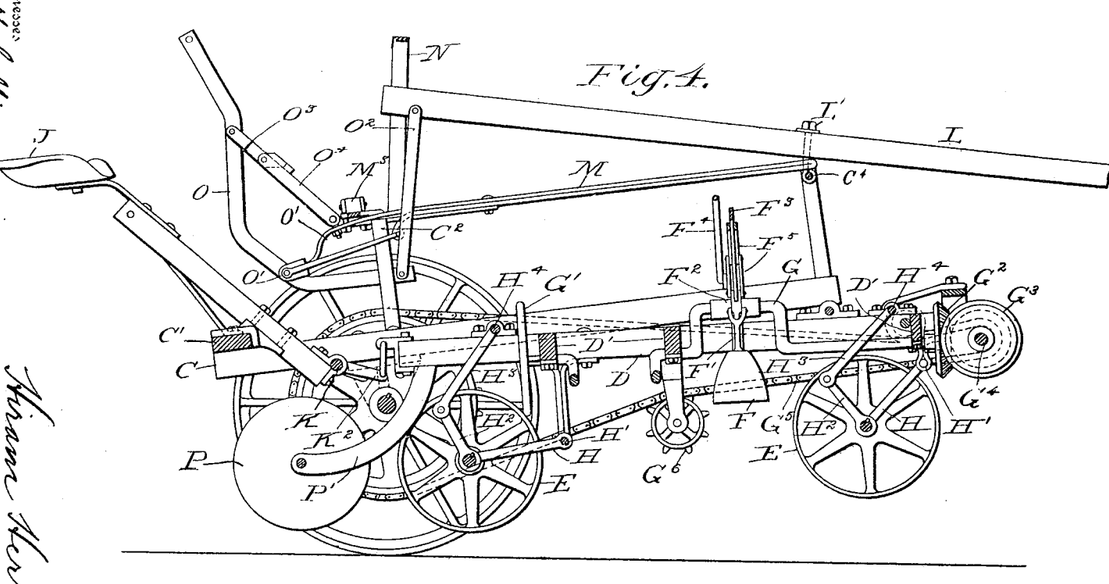
Fig. 4 is a longitudinal vertical section of the machine shown with its front part raised.
Figures 11, 12, 13, 14:
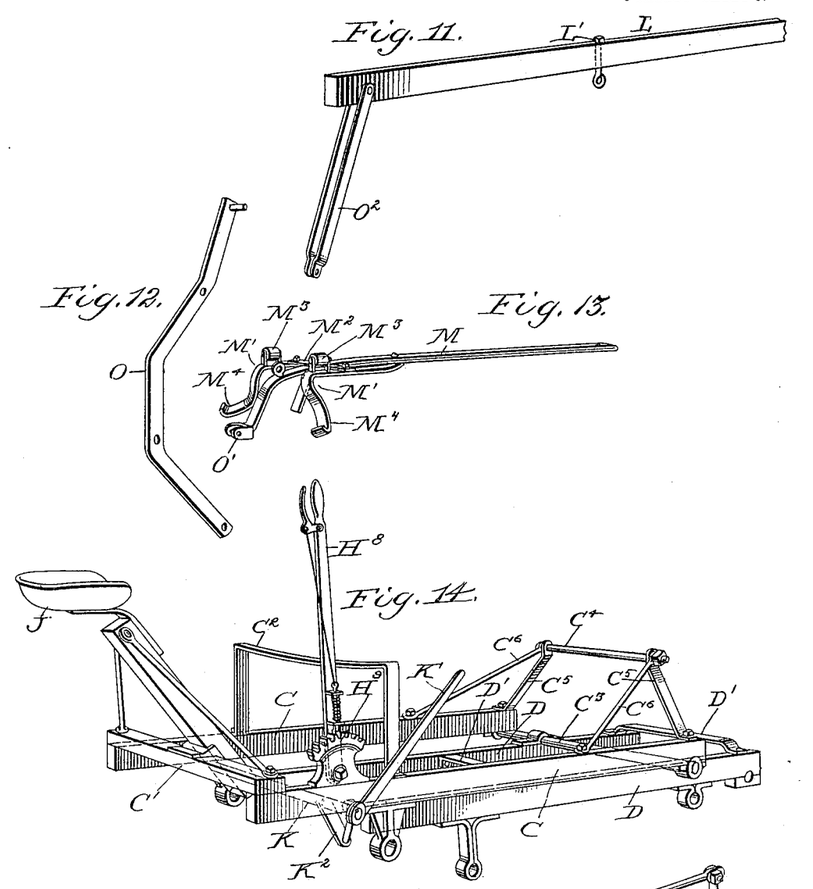
Fig. 11 is a detail view of the tongue of the machine.
Fig. 12 is a detail view of the lever employed for lifting the front end of the machine.
Fig. 13 is a detail view of a bar arranged under the tongue, together with parts connected with said bar.
Fig. 14 is a perspective view of the main portion of the framework of the machine.
Figure 15:
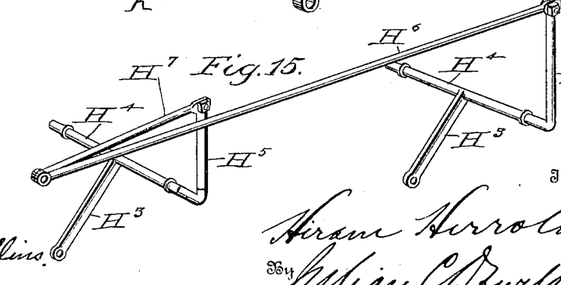
Fig. 15 is a perspective view of a construction of levers and links for regulating the height of the gage-wheels.

The letter A indicates the main drive-wheels of the machine fixedly mounted upon the revoluble shaft or axle B, from which motion is transmitted to the choppers. Said shaft B supports a main outside frame comprising side bars C C and a rear cross-bar C', the frame being also braced by an upstanding yoke C², near the rear thereof, and by a front cross-bar C³, and also by a cross-bar C⁴, connecting-standards C⁵, and brace-rods C⁶, rising from the forward ends of the main frame-bars C. The construction is shown more clearly in Figs. 1 and 14. Between the side beams C C of the outside frame and extending under and forwardly thereof is an inside frame comprising side bars D D and cross-bars D' D'. Said inside frame is pivotally connected to the outside frame by means of the cross-bar C³, which is a round rod journaled in or on the side bars D of the inside frame and attached to the side bars C of the outside frame. This mode of connection allows an up-and-down movement of the inside frame relative to the drive-wheels A, the front end of the outside frame being adapted to oscillate or swing up and down as the inside frame moves over irregular ground, while the inside frame may also turn on its pivotal axle C³. The purpose of this will appear later.

The inside frame is mounted on gage-wheels E E, arranged fore and aft of said frame, which thus supports the forward end of the outside frame. Said inside frame also carries the chopping mechanism, comprising revolving hoes or blades F F, carried by the oppositely-cranked portions of a crank-shaft G, which is arranged longitudinally of the machine and rotatably mounted in suitable bearings, as in the cross-bars D' D' of the inside frame. Said shaft G carries a balance-wheel G' at its rear end, and at its front end has a bevel gear-wheel $G^2$, meshing with a bevel-gear $G^3$ on a cross-shaft $G^4$, to which motion is transmitted from the driving axle or shaft B by means of a sprocket-chain $G^5$, passing around suitable sprocket-wheels on the shafts B and $G^4$. In order to keep the sprocket-chain at the proper tension, the same is passed over idle sprockets $G^6$, one of which may be vertically adjustable in a slotted hanger depending from the outside frame. It will thus be observed that the inside frame carrying the cotton-choppers is independently supported, and by reason of its capability of pivotal movement with respect to the outside frame carrying the drive-wheels the machine as a whole is practically unaffected by the ordinary inequalities in the surface of the ground and advantageous flexibility or capacity of relatively vertical movement between the wheels and choppers is obtained. This construction allows the choppers to maintain a more nearly uniform operation upon the plants than in those prior machines in which the assembled parts form a rigid whole without provision for relative movement, except, perhaps, an adjusting movement of the choppers, the choppers being carried by a rigid frame supported by the main drive-wheels.

Means must be provided for regulating the choppers—that is, for moving them into and out of operative relation with the soil and determining the depth to which they shall strike—for which purpose the pivotally-connected inside carrying-frame is made adjustable with respect to the ground, as follows: The gage-wheels E E are mounted on adjustable axles which are pivotally connected, by means of links H, with cross-rods H', extending between hangers on the under sides of the frame-bars D. The axle of each pair of gage-wheels is also connected, by means of a link $H^2$, to a crank arm or lever $H^3$, said crank arm or lever extending rigidly from a cross-rod or rock-shaft $H^4$, mounted on said side bars D. Both cross-rods or shafts $H^4$ are provided with upstanding arms or levers $H^5$ at one side, and said arms $H^5$ are connected by links $H^6$ and $H^7$ with an actuating-lever $H^8$, pivotally connected to the outside frame, near the rear end thereof, in reach of the driver's seat J, said driver's seat being suitably supported upon the rear portion of the outside frame. (See Figs. 1, 2, 3, 14, and 15.) When the lever $H^8$ in the embodiment illustrated is pulled back toward the driver's seat, the gage-wheels E E will be forced downwardly away from the inner frame, and hence the choppers will be raised accordingly from the ground, and in this way the elevation of the inside frame, together with the choppers carried thereby, can be controlled at will. By providing for the lever $H^8$ the usual segmental rack and lock, as indicated at $H^9$, the position of the gage-wheels with respect to the inner frame may be exactly adjusted and fixed, and thereby the depth of the chopping determined.

Mounted in the rear end of the outside frame C C is a cross-shaft K, having at one end or at the side of the machine a rigid manipulating-lever K' thereon. The shaft K is provided with rigid arms $K^2$, having pivotal link connections with the side bars D D of the inside frame. By means of this lever the rear end of the inside frame may be temporarily raised with respect to the outside frame, as may be desirable in turning.

In connection with the arrangement just described for lifting the rear end of the inside frame means is also provided for lifting the entire front of the machine by the draft-pole or tongue L, the forward end of which is supported by the team, while its rear portion is adjustably connected to the machine and provided with mechanism for lifting it in the manner now to be explained. Said tongue is supported upon the upper front cross-rod $C^4$ and is connected thereto by an eyebolt L', said eyebolt passing vertically through the tongue to provide a swivel connection and allow free lateral oscillation of the tongue and having its eye pivotally engaging the cross-rod $C^4$, thus allowing vertical oscillation of the tongue also. Directly beneath the tongue, arranged longitudinally of the machine, is a bar M, which may be formed of two thicknesses of strap-iron. At its front end this bar has a pivotal connection with the middle of the cross-rod $C^4$, as by means of a loose engagement with the swivel-bolt L'. At its rear end said longitudinal bar M is supported by the transverse upstanding yoke $C^2$ and is movable on said yoke back and forth across the machine, as and for the purposes hereinafter explained, the yoke $C^2$ being curved to allow this movement of the bar. Secured to the rear end of the bar M is an upstanding vertical guideway N, within which the rear end of the tongue is adapted to move up and down. The means for lifting the rear end of the tongue consists of the bent lever O, which is intermediately fulcrumed at O' on a rear down-curved extension of the bar M and has its lower end connected with the tongue by the links $O^2$. Said lever may be further connected at its power end with the bar M by means of two links $O^3$ and $O^4$, which are pivotally connected together. This lever O being arranged medially of the machine is directly in front of the driver's seat. When the lever is pulled clear back, the links O³ and O⁴ straighten out and tend to aid in holding the lever forced backward. The forward end of the tongue being supported by the team pulling the machine and the tongue being pivoted or fulcrumed on the cross-bar C¹, it is evident that pulling back on the lever O will raise the rear end of the tongue, and thereby lift the entire front of the machine by means of the eyebolt connection L' with the framework of the machine at the front. Thus when desired both the front and rear of the machine, except the main drive-wheels A, may be raised clear of the ground by means of the levers K' and O.

The means for guiding the machine by the feet of the driver is also operative upon the tongue in the following manner: Rigid with the rear portion of the bar M is a fork M', whose arms are suitably braced by the cross-bar M² and are slidable upon the yoke C², preferably by means of rollers M³, and said arms M' are formed rearwardly with foot-rests M⁴. The yoke C² is of course shaped as a curve or arc with the swivel-bolt L' as a center. The driver, sitting in the seat J, places his feet upon the foot-rests M⁴, and thereby he can swing the framework of the machine to one side or the other relative to the tongue, so that the course of the machine can be quickly and temporarily changed without depending upon the team for this purpose, thus making it easier to accurately follow the row than could be done if the tongue were mounted rigidly upon the machine. In most cotton-chopping machines in addition to the choppers for thinning out the row the implement is provided with disks or other devices for throwing away the soil from the sides of the row, and obviously the machine must be guided accurately to conform with the row or else the plants would be plowed out of the ground. The feature of my invention just described provides for the accomplishment of this object of accurately guiding the machine in accordance with the row.

The inner chopper-carrying frame may also carry suitable disks, plows, or other devices for throwing the soil away from the row and these may be provided either in front or in rear of the choppers. As shown, a pair of disks P are arranged in the rear of the choppers, the said disks being carried by the curved standards P', depending from the rear of the inner frame, said disks serving to throw the earth away from each side of the plants after they have been thinned out.

Figure 5:
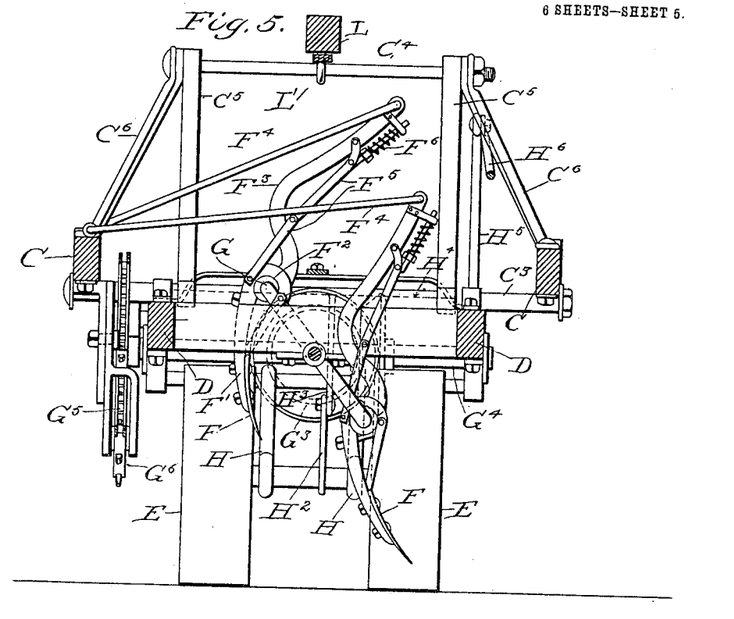
Fig. 5 is a transverse section of the machine, taken behind the chopping mechanism and looking toward the front.
Figures 6, 7:
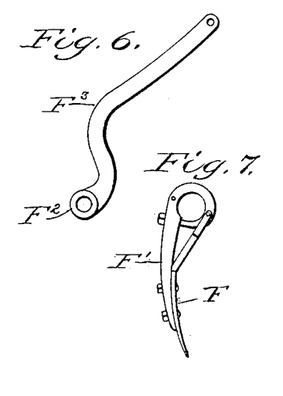
Fig. 6 is a detail view of an arm connected to the chopping hoe or tool and forming part of the mechanism for maintaining the tool in proper relation.
Fig. 7 is a side view of one of the hoes.
Figures 8, 9:
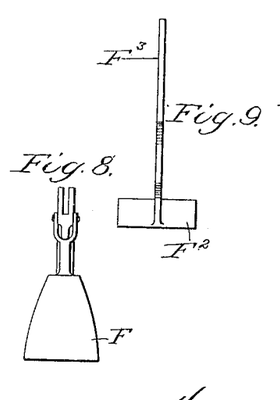
Fig. 8 is a front view thereof.
Fig. 9 is a front view of the arm shown in Fig. 6.
Figure 10:
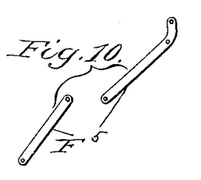
Fig. 10 is a detail view of two links which are connected with each hoe and with a spring for holding the hoe in yielding position.

It will be understood that one chopping-hoe may be sufficient, though I preferably employ a pair of such hoes, as shown, the said hoes revolving and acting successively upon the row. Each of said hoes F comprises a blade or cutting-tool whose shank F' is attached to a sleeve F², rotatably mounted on the crank-shaft G and provided with means for keeping the hoe in proper position and preventing it from rotating when coming into contact with the ground. In other words, the hoes must of course revolve while maintaining a substantially constant upright or inclined relation to the soil, as shown in Fig. 5. To this end each sleeve F² has attached thereto an upstanding arm F³, the upper end of which is pivotally connected, by means of a link F⁴, with one of the side bars C of the outside frame. Hence it is evident that as the cranks revolve the hoes will revolve therewith, acting successively upon the row, but will not rotate on the axes of the sleeves F².

To prevent injury to the hoes in case of striking unyielding obstruction during their operation, the hoe-shanks are preferably allowed to turn relative to the arms F³, and said arms F³ are connected with the hoe-shanks by a pair of pivotally-connected links F⁵ and having springs F⁶ acting upon said links in such manner as to hold the hoes in their proper position while yet allowing yielding thereof in the case of striking any hard obstruction.

It will be seen that the objects of my invention, primarily stated, are effectively accomplished by the construction described.

Having thus fully described my invention, what I claim as new, and desire to secure by Letters Patent of the United States, is—

1. In a cotton-chopper, the combination of two independent frames arranged one within the other and having a horizontal pivotal connection at their front parts, a pair of drive-wheels supporting one of said frames, a movable chopping-tool carried by the other frame in advance of said drive-wheels, and means for actuating said chopping-tool from said drive-wheels.

2. In a cotton-chopper, the combination of two independent frames arranged together and having a horizontal pivotal connection at their front parts, a movable chopping-tool carried by one frame, gage-wheels supporting said frame, a pair of drive-wheels supporting the other frame, and means for operating said chopping-tool from said drive-wheels, the frame carrying the chopping-tool being adapted to move up and down relative to the drive-wheels.

3. In a cotton-chopper, the combination of an outside main frame, an inside frame inclosed thereby and having its front part pivotally connected to the front end of the outside frame on a horizontal axis, wheels supporting the inside frame, a movable chopping-tool carried by said inside frame, a pair of drive-wheels supporting the rear end of the outside frame, and means for operating said chopping-tool from said drive-wheels.

4. In a cotton-chopper, the combination of the main frame and supporting drive-wheels therefor attached to the rear part of said frame, a cross-rod at the front end of said frame, and an independently wheel-supported frame arranged within said main frame and having its front part pivotally attached to said cross-rod, a revolving chopping mechanism carried by the latter frame, and means for actuating said mechanism from said drive-wheels.

5. In a cotton-chopper, the combination of a main frame, a pair of supporting drive-wheels therefor, an independently wheel-supported frame carrying a chopping mechanism, the latter frame having a pivotal connection with the forward portion of the main frame allowing an independent up and down movement of the chopper-carrying frame relative to the drive-wheels, and means for operating said mechanism from said drive-wheels.

6. In a cotton-chopper, the combination of a main frame and drive-wheels supporting the rear end of said frame, an independently wheel-supported chopper-carrying frame pivotally connected to the front end of the main frame so as to allow up and down movement of the chopper-carrying frame relative to the drive-wheels, means for adjusting the chopper-carrying frame relative to its supporting-wheels, and means for actuating the chopper mechanism from the supporting-wheels of the main frame.

7. In a cotton-chopper, the combination of an outside main frame, a pair of supporting drive-wheels therefor, an inside independently wheel-supported chopper-carrying frame, a cross-rod attached to the front ends of both frames and establishing a pivotal connection between them, allowing a relative vertical oscillation of the frames, and mechanism for actuating choppers from the drive-wheels.

8. In a cotton-chopper, the combination of a main frame supported at its rear end by a pair of drive-wheels, an independently wheel-supported chopping mechanism arranged within and connected with the main frame so as to be capable of up and down movement relative thereto, means for actuating the choppers by the travel of the machine, means for adjusting the chopping mechanism with relation to the supporting-wheels thereof, and means for adjusting as a whole the said wheel-supported chopping mechanism with relation to the main frame, and means for lifting the entire chopping mechanism and front of the machine so as to cause the entire machine to travel on the drive-wheels.

9. In a cotton-chopper, the combination of a main frame, a pair of supporting-wheels therefor at the rear of said frame, an independently wheel-supported inside frame carrying chopping mechanism, means for operating said chopping mechanism by the travel of the machine, the two frames having a front horizontal pivotal connection allowing a vertical swinging movement of the one frame with respect to the other, and means mounted on the main frame for lifting the rear end of the chopper-carrying frame.

10. In a cotton-chopper, the combination of a main frame, a pair of supporting-wheels therefor, a tongue attached to said frame adapted to move vertically, an independently wheel-supported frame carrying chopping mechanism, the latter frame arranged within the former, means for operating said chopping mechanism by the travel of the machine, the two frames having a front horizontal pivotal connection allowing a vertical swinging movement of the one frame with respect to the other, a lever mounted on the main frame, and mechanism actuated by said lever for lifting the rear end of the chopper-carrying frame, and a lever on the main frame and connections between the same and the tongue whereby the entire front of the machine can be lifted and the entire machine caused to travel on the drive-wheels.

11. In a cotton-chopper, the combination of a main frame, a pair of supporting drive-wheels therefor, an independently wheel-supported chopper-carrying frame, the forward portion of the main frame being supported by said chopper-carrying frame and having a horizontal pivotal connection therewith allowing relative movement between the two frames, a cross-shaft mounted on the main frame, a manipulating-lever therefor, and rigid arms on said cross-shaft pivotally connected with the rear end of the chopper-carrying frame.

12. In a cotton-chopper, the combination of a main frame, a pair of supporting drive-wheels therefor, a chopper-carrying frame pivotally connected with the forward portion of the main frame, the chopper-carrying frame thereby supporting the forward portion of said main frame, gage-wheels for said chopper-carrying frame mounted on swinging axles, cross-shafts on the chopper-carrying frame, having crank-arms connected with said axles and having other arms connected by links or rods with a lever mounted on the main frame, whereby the position of the chopper-carrying frame relative to its gage-wheels may be adjusted by said lever.

13. In a cotton-chopper, the combination of a main frame, a pair of supporting drive-wheels therefor, an independently wheel-supported chopper-carrying frame supporting the forward portion of the main frame and pivotally connected therewith, means on the main frame for lifting the rear portion of the chopper-carrying frame, a tongue having an intermediate fulcrum on the forward portion of the machine, the forward part of the tongue adapted to be supported by the team drawing the machine, and means mounted on the main frame for lifting the rear end of the tongue and thereby elevating the entire front of the machine.

14. In a cotton-chopper, the combination of a main frame, a pair of supporting drive-wheels therefor, an independently wheel-supported chopper-carrying frame supporting the forward portion of the main frame and pivotally connected therewith to allow relative movement between the frames, means on the main frame for lifting the rear portion of the chopper-carrying frame, a tongue having an intermediate fulcrum on the forward portion of the machine, the forward part of the tongue adapted to be supported by the team drawing the machine, and means mounted on the main frame for lifting the rear end of the tongue and thereby elevating the entire front of the machine, said means comprising an intermediately-fulcrumed lever one arm of which serves as a handle while the other arm is connected with the rear end of the tongue by links.

15. In a cotton-chopper, the combination of a wheel-supported frame and chopping mechanism carried thereby, a tongue having an intermediate fulcrum on the forward portion of the machine, the forward part of the tongue adapted to be supported by the team drawing the machine, and means carried by the machine for lifting the rear end of the tongue and thereby elevating the front portion of the machine, the chopping mechanism being liftable therewith.

16. In a cotton-chopper, the combination of a main frame and supporting drive-wheels therefor, the main frame extending forwardly of said drive-wheels, a chopper-carrying frame arranged within said main frame and forwardly of said drive-wheels, there being a horizontal pivotal connection between the front portion of the main frame and the chopper-carrying frame, gage-wheels supporting said chopper-carrying frame, whereby said chopper-carrying frame supports the front portion of the main frame, and means for operating the chopper mechanism from said drive-wheels.

17. In a cotton-chopper, the combination of a main frame and supporting drive-wheels therefor, the main frame extending forwardly of said drive-wheels, a chopper-carrying frame arranged within said main frame and forwardly of said drive-wheels, there being a horizontal pivotal connection between the front portion of the main frame and the chopper-carrying frame, gage-wheels supporting said chopper-carrying frame, whereby said chopper-carrying frame supports the front portion of the main frame, and means for operating the chopper mechanism from said drive-wheels, means for adjusting the height of the chopper-carrying frame relative to its gage-wheels, and a lever mounted on the main frame for operating said means.

18. In a cotton-chopper, the combination of a main frame and supporting drive-wheels therefor, the main frame extending forwardly of said drive-wheels, a chopper-carrying frame arranged within said main frame and forwardly of said drive-wheels, there being a horizontal pivotal connection between the front portion of the main frame and the chopper-carrying frame, gage-wheels supporting said chopper-carrying frame, whereby said chopper-carrying frame supports the front portion of the main frame, and means for operating the chopper mechanism from said drive-wheels, means for lifting the rear end of the chopper-carrying frame, and a lever operated on the main frame for operating said means.

19. In a cotton-chopper, the combination of a main frame and supporting drive-wheels therefor, a wheel-supported chopper mechanism arranged forwardly of said drive-wheels, the frame of said chopper mechanism having a horizontal pivotal connection with the forward portion of the main frame, a tongue having an intermediate fulcrum on the forward portion of the main frame, and means carried by said main frame and connected with the rear end of the tongue for lifting said rear end of the tongue and thereby tilting up the forward end of the machine.

20. In a cotton-chopper, the combination of a main frame, supporting drive-wheels therefor, a wheel-supported frame arranged forwardly of said drive-wheels and having a horizontal pivotal connection with the forward end of said main frame, a chopping mechanism carried by the latter frame, means for operating said chopping mechanism by the travel of the machine, a tongue having an intermediate attachment to the forward end of the main frame and adapted to be moved vertically and horizontally, a driver's seat on the main frame, means for moving the rear end of the tongue laterally, and a lever and connections movable with the rear end of the tongue for lifting the same and thereby tilting up the front portion of the machine.

21. In a cotton-chopper, the combination of a wheel-supported frame, chopping mechanism carried thereby, means for operating the chopping mechanism by the drive-wheels of the machine, relatively fixed cultivating devices associated with the chopping mechanism, a driver's seat mounted on the frame, a tongue having an intermediate swivel connection with the forward portion of the machine, and means within reach of the driver's seat for shifting the frame laterally with respect to the rear end of the tongue.

22. In a cotton-chopper, the combination of a wheel-supported frame, chopping mechanism carried thereby, means for operating the chopping mechanism by the drive-wheels of the machine, a driver's seat mounted on the frame, a tongue having an intermediate swivel connection with the forward portion of the machine, a curved yoke extending across the frame, the rear end of the tongue having a fork attached thereto which is slidable on said yoke, and foot-rests attached to said fork and adapted for the driver's feet, whereby the driver can shift the frame laterally with respect to the rear end of the tongue.

23. In a cotton-chopper, the combination of a crank, a cutting-tool having its shank loosely mounted on said crank, an arm connected with the crank, a link pivotally connecting said arm with the frame of the machine, and a yieldable connection between said arm and shank of the tool for holding the tool yieldably in proper position.

24. In a cotton-chopper, the combination of a crank, a cutting-tool having its shank loosely mounted on said crank, an arm loosely mounted on said crank, the shank of the cutting-tool being movable relatively to said arm, and a connection between said arm and the shank of the tool comprising pivotally-connected links and a spring, thereby holding the tool in proper working position but allowing the connection to yield when the tool strikes an obstruction.

In testimony whereof I affix my signature in presence of two witnesses.

HIRAM HERROLD.

Witnesses:
O. S. HARRIS,
E. L. MANTOR.